US009261923B2

(12) United States Patent
Farrow et al.

(10) Patent No.: US 9,261,923 B2
(45) Date of Patent: Feb. 16, 2016

(54) CARD RETENTION MECHANISM

(71) Applicant: Lenovo (Singapore) Pte. Ltd., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US)

(73) Assignee: Lenovo (Singapore) Pte. Ltd.

( * ) Notice: Subject to any disclaimer, the term of this patent is extended or adjusted under 35 U.S.C. 154(b) by 6 days.

(21) Appl. No.: 14/229,889

(22) Filed: Mar. 29, 2014

(65) Prior Publication Data
US 2015/0277511 A1 Oct. 1, 2015

(51) Int. Cl.
G06F 1/16 (2006.01)
G06F 1/18 (2006.01)

(52) U.S. Cl.
CPC ...................................... G06F 1/183 (2013.01)

(58) Field of Classification Search
USPC ......... 713/300, 320, 153, 1, 323, 189, 2, 166, 713/340, 324; 361/690, 695, 679.4, 679.31, 361/679.02, 679.21, 679.39, 679.33, 361/679.48, 679.46, 679.59, 679.58, 361/679.49, 679.08, 679.32, 679.47, 361/679.57, 679.45, 679.5, 679.41; 439/62, 439/260, 66, 540.1, 296, 338, 492, 495; 345/173, 418, 419, 3.1, 501, 174, 619, 345/473, 161, 427.211; 455/457, 255, 424
See application file for complete search history.

(56) References Cited

U.S. PATENT DOCUMENTS 6,781,831 B1 * 8/2004 Banton et al. ................. 361/690
6,961,242 B2 * 11/2005 Espinoza-Ibarra et al. ... 361/695
7,191,347 B2 * 3/2007 Bigelow et al. ............... 713/300

* cited by examiner

Primary Examiner — Hung Duong
(74) Attorney, Agent, or Firm — Brian J. Pangrle

(57) ABSTRACT

A system can include a chassis; a board operatively coupled to the chassis where the board includes card slots aligned along respective parallel planes and circuitry operatively coupled to the slots; a processor operatively coupled to the circuitry of the board; memory accessible by the processor; a bracket operatively coupled to the chassis where the bracket includes parallel recesses corresponding to the parallel planes; and a retainer operatively coupled to the bracket where the retainer includes parallel recesses where in an open orientation the parallel recesses of the retainer align with the parallel recesses of the bracket and where in a retention orientation the parallel recesses of the retainer misalign with the parallel recesses of the bracket. Various other apparatuses, systems, methods, etc., are also disclosed.

20 Claims, 12 Drawing Sheets

US 9,261,923 B2

CARD RETENTION MECHANISM

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and one or more cards, for example, disposed in one or more card slots.

SUMMARY

A system can include a chassis; a board operatively coupled to the chassis where the board includes card slots aligned along respective parallel planes and circuitry operatively coupled to the slots; a processor operatively coupled to the circuitry of the board; memory accessible by the processor; a bracket operatively coupled to the chassis where the bracket includes parallel recesses corresponding to the parallel planes; and a retainer operatively coupled to the bracket where the retainer includes parallel recesses where in an open orientation the parallel recesses of the retainer align with the parallel recesses of the bracket and where in a retention orientation the parallel recesses of the retainer misalign with the parallel recesses of the bracket. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
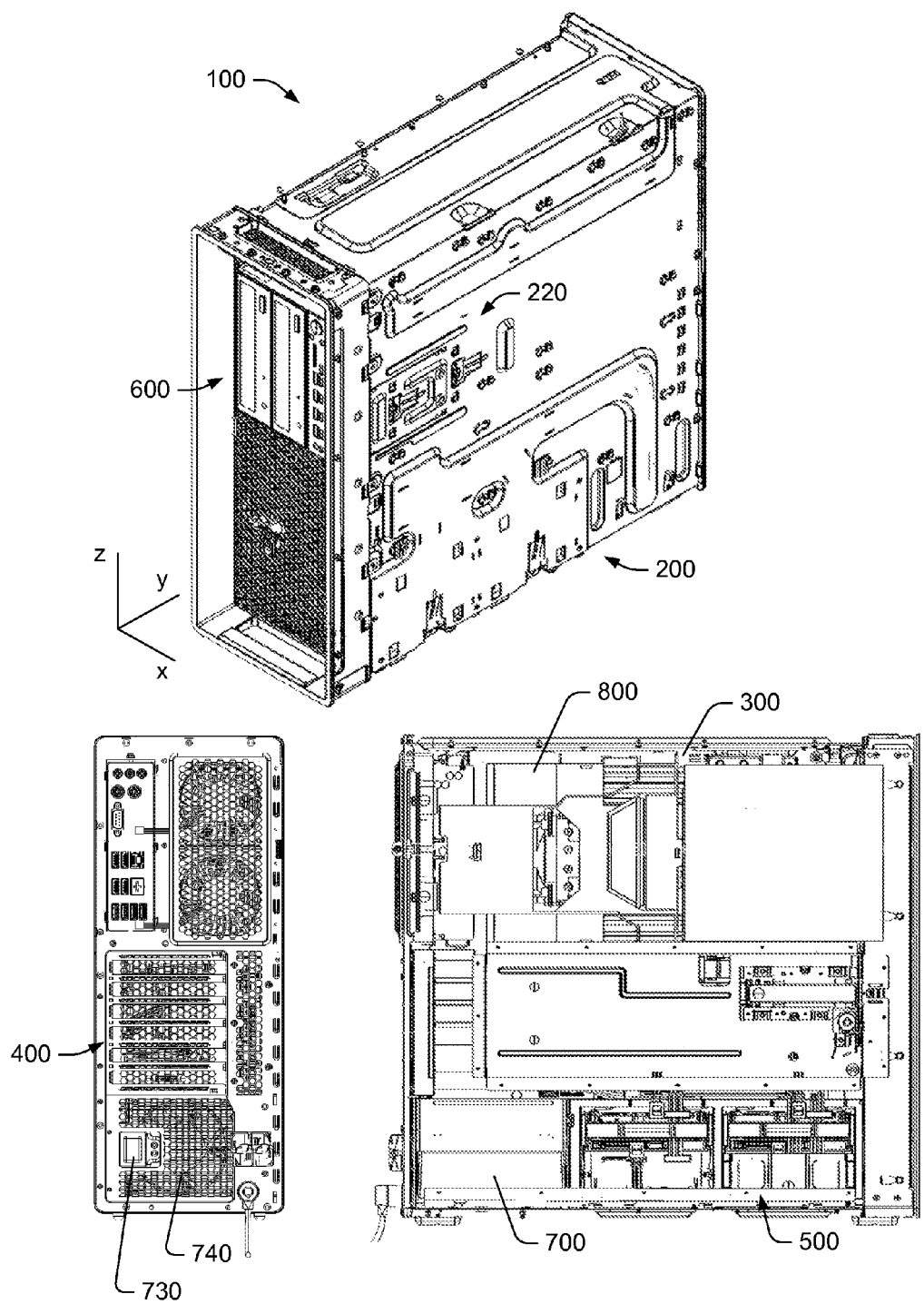
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply unit 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism 220 for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 1100 (see, e.g., the bays 500).

In the example of FIG. 1, the computing system 100 includes the power supply assembly 700, which includes a connector 730 for receipt of power (e.g., via a power cord) and which may include a fan 740 (e.g., or fans). The power supply assembly 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans). In the example of FIG. 1, a fan 801 is shown as being disposed in an x,z-plane proximate to the back of the computing system 100.

In the example of FIG. 1 the board 300 of the computing system 100 can include one or more processors 310-1 (e.g., and 310-2, etc.) and memory 330-1 and 330-2 accessible by at least one of the one or more processors (e.g., 310-1, 310-2, etc.). One or more of the bays 500 and/or the bays 600 of the computing system 100 may include one or more storage devices, which may be accessible by at least one of the one or more processors.

Figure 2:
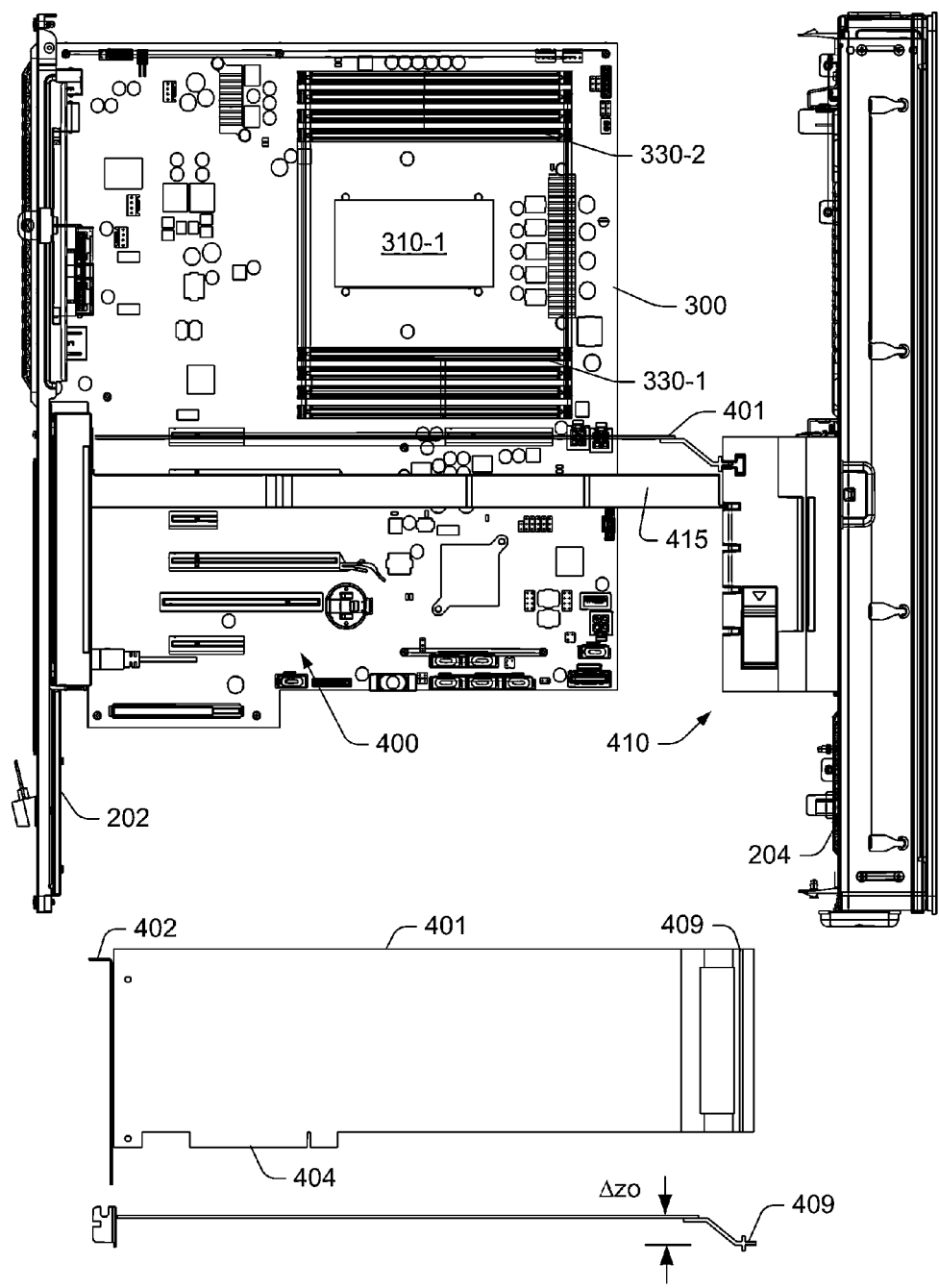
FIG. 2 is a series of diagrams that include a view of a portion of the computing system of FIG. 1 and a view of a card.

FIG. 2 shows an example of a portion of the computing system 100 of FIG. 1. In the example of FIG. 2, portions of the chassis 200 are shown, including a back portion 202 and a front portion 204. Various circuits or circuitry may be mounted to and/or integral to the board 300. For example, in FIG. 2, the board 300 is shown as carrying the processor 310-1 and memory 330-1 and 330-2.

As shown, the board 300 can include the slots 400 (e.g., at least a portion of a total number of slots of the computing system 100). As an example, a portion of the slots 400 may be oriented in parallel. For example, where such slots are configured for receipt of respective cards, the slots may orient the cards in parallel planes (e.g., with spaces therebetween for air flow, etc.).

In the example of FIG. 2, a card 401 is shown as including a backplate 402 and a front mounting component 407 as well as an edge 404 that may be received via one of the slots 400 (e.g., an edge connector). As shown, a card retention assembly 410 may act to retain the card 401 and/or a card component 415.

As an example, the card component 415 may be positioned in the portion of the computing system 100 as shown in FIG. 2. For example, consider the card component 415 as shown extending between the back portion 202 and the front portion 204 of the chassis 200 where the card component 415 is retained at least in part by the card retention assembly 410.

As an example, a card and/or a card component may include an offset between a plane defined by a card or the card component and a front mounting component (e.g., or feature). For example, the card 401 is shown as including an offset ($\Delta z_o$) between the edge 404 and the front mounting component 407. As an example, the card retention assembly 410 of FIG. 2 may be positioned to account for such an offset. For example, recesses of the card retention assembly 410 may be offset with respect to the slots 400 (e.g., offset in a z-direction). As an example, the card retention assembly 410 can include fewer or more recesses than slots. As an example, a computing system may include multiple card retention assemblies. As an example, a computing system may include one card retention assembly such as the assembly 410 with a first number of recesses and another card retention assembly such as the assembly 410 with a second number of recesses, which may differ from the first number of recesses.

As an example, a card or a card component may be operatively coupled to a chassis of a computing system at a back end of the card or the card component. In the example of FIG. 2, a card retention mechanism configured to retain back ends (e.g., backplates, etc.) may be operatively coupled to the chassis 200 (e.g., the back portion 202 of the chassis 200).

As an example, slots may include card slots for cards such as, for example, PCI cards. As an example, a PCI card may be specified by a standard or standards. As an example, a maximum width of a PCI card may be about 15 mm (e.g., about 0.6 inches). As an example, a PCI card may be specified in part by height, for example, consider full-height and low-profile specifications. As an example, a card may include a backplate that may be configured to fasten the card to another component (e.g., a chassis, etc.), for example, to help stabilize the card. As to a backplate, it may be fixable using a screw such as, for example, a 6-32 or M3 screw. As an example, a card may include one or more external connectors.

As an example, a card may be specified in part by a length. For example, consider standards that specify full-length and half-length for full-height cards, and MD1 and MD2 for low-profile cards.

As an example, a slot may be a connector, for example, for electrically connecting circuitry of a card to circuitry of a board, etc. As an example, a PCI connector may be defined as including 62 contacts on each side of an edge connector where, for example, two or four contact positions are replaced by key notches. In such an example, a card may include 60 or 58 contacts on each side. In terms of numbering, a connector may use a "pin" based convention where, for example, pin 1 is closest to the backplate.

Figure 3:
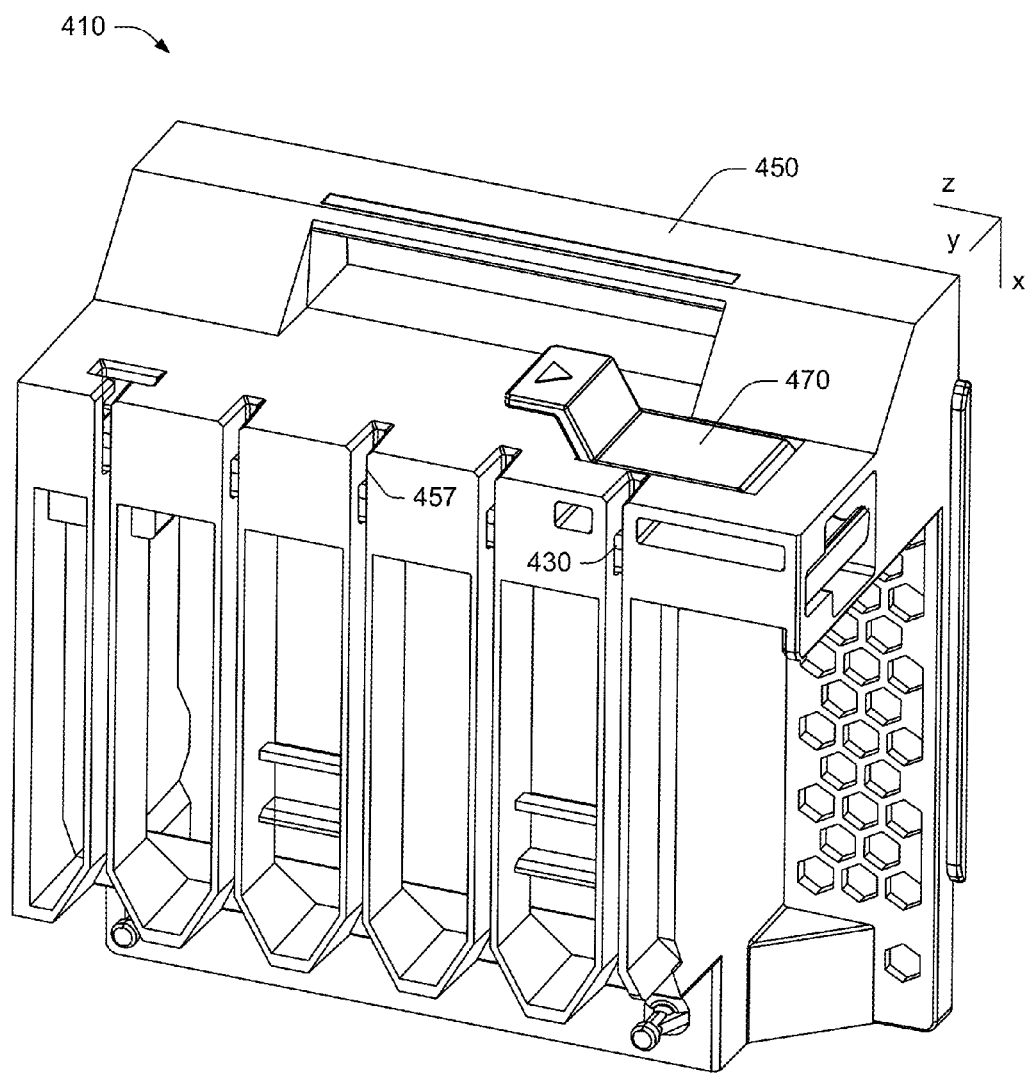
FIG. 3 is a diagram of a perspective view of an example of a card retention assembly.

FIG. 3 shows an example of a card retention assembly 410 that includes a retainer 430, a bracket 450 and a handle 470. In such an example, the handle 470 is operatively coupled to the retainer 430 and the bracket 450 such that movement of the handle 470 moves the retainer 430 with respect to the bracket 450. For example, the handle 470 may pivot with respect to the bracket 450 such that the retainer 430 slides with respect to the bracket 450. In such a manner, the retainer 430 may be transitioned from an open orientation and a retention orientation.

Figure 4:
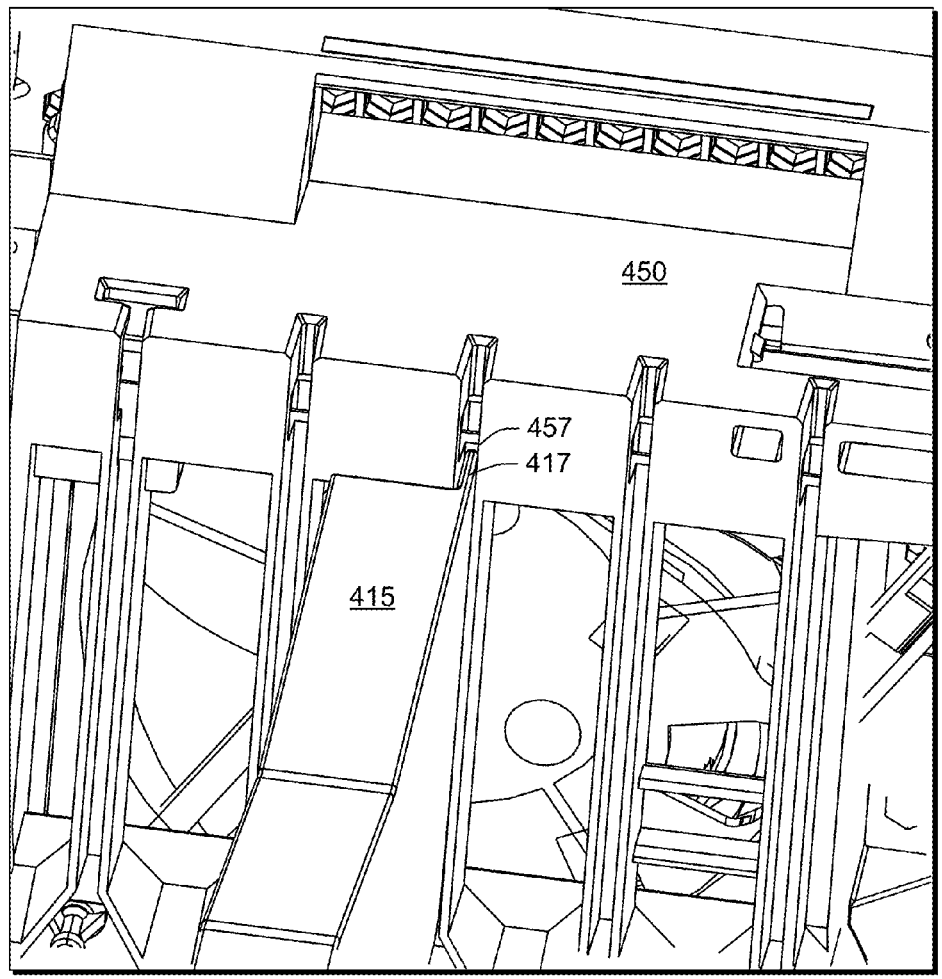
FIG. 4 is a series of diagrams of perspective views of the card retention assembly of FIG. 3 with respect to an example of a card component.
Figure 4:
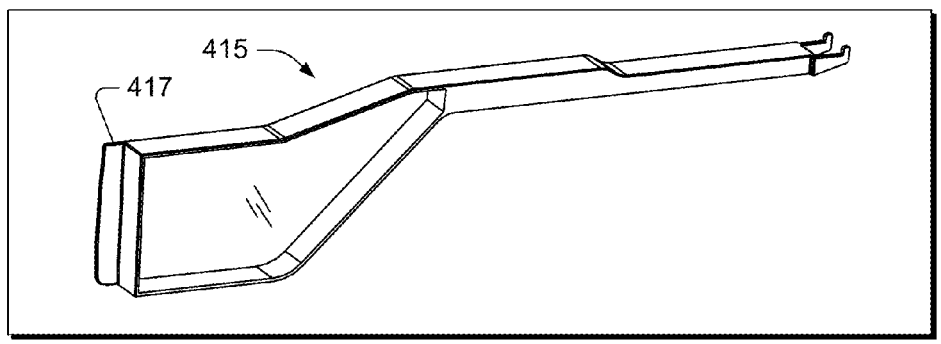

FIG. 4 shows a perspective view of a portion of a computing system such as, for example, the computing system 100 of FIG. 1. In the example of FIG. 4, the bracket 450 is shown as including a recess 457 that can receive a portion 417 of a card component 415 (e.g., a front mounting component), which may be a component that may provide for, at least in part, mounting of a card in a slot. In the example of FIG. 4, the component 415 may be translated along an egress path (e.g., along a longitudinal axis of the recess), for example, in a plane defined by portion 417 of the component 415. As an example, the retainer 430 may be inserted into the bracket 450 and positioned to block the egress path and thereby retain the component 415. As mentioned, the handle 470 may be operatively coupled to the bracket 450 and used to move the retainer 430 between an open orientation and a retention orientation. In the open orientation, a card or a component may be inserted into the recess 457 or removed from the recess 457. While the card component 415 is shown, as an example, the front mounting component 407 of the card 401 of FIG. 2 may be received by the recess 457 of the bracket 450.

As an example, the bracket 450 may be configured to mount a fan unit. For example, the bracket 450 may include a frame portion that can receive a frame of a fan unit. In such an example, cards and/or card components that may be retained by a card retention mechanism that includes such a bracket may be exposed to airflow driven by operation of the fan unit. For example, air may flow between cards, card components, etc. in spaces that exist therebetween. As an example, cards may include respective edge connectors that are received by respective slots to thereby arrange the cards in parallel planes where spaces exists therebetween that may be airflow corridors. In such an example, where the cards and/or card components are retained by a card retention mechanism that can mount a fan unit or be mounted proximate to a fan unit, such a fan unit may drive air to flow in one or more of the airflow corridors (see also examples of FIG. 10 and FIG. 11).

Figure 5:
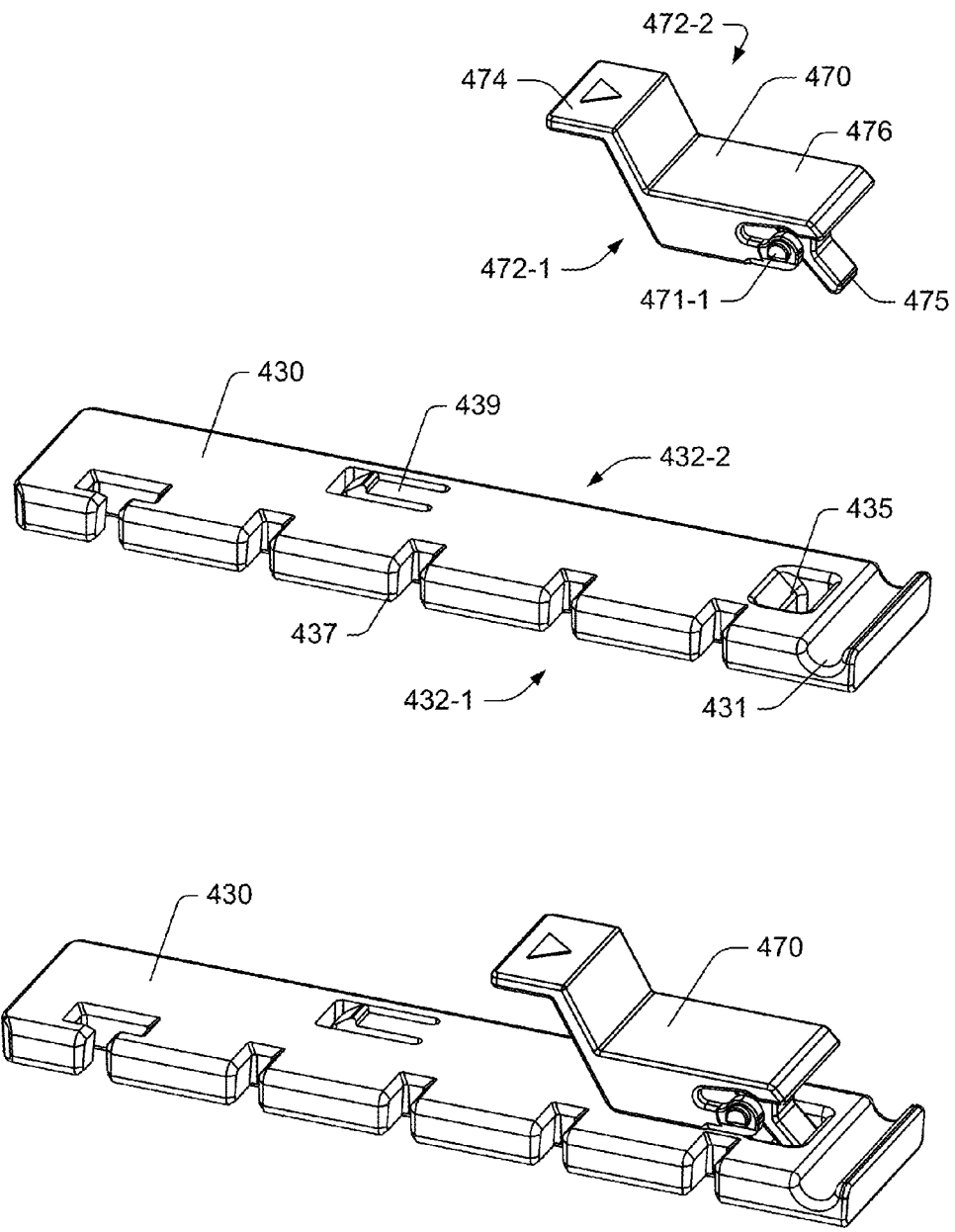
FIG. 5 and FIG. 6 are a series of diagrams of views of various components of the card retention assembly of FIG. 3.
Figure 6:
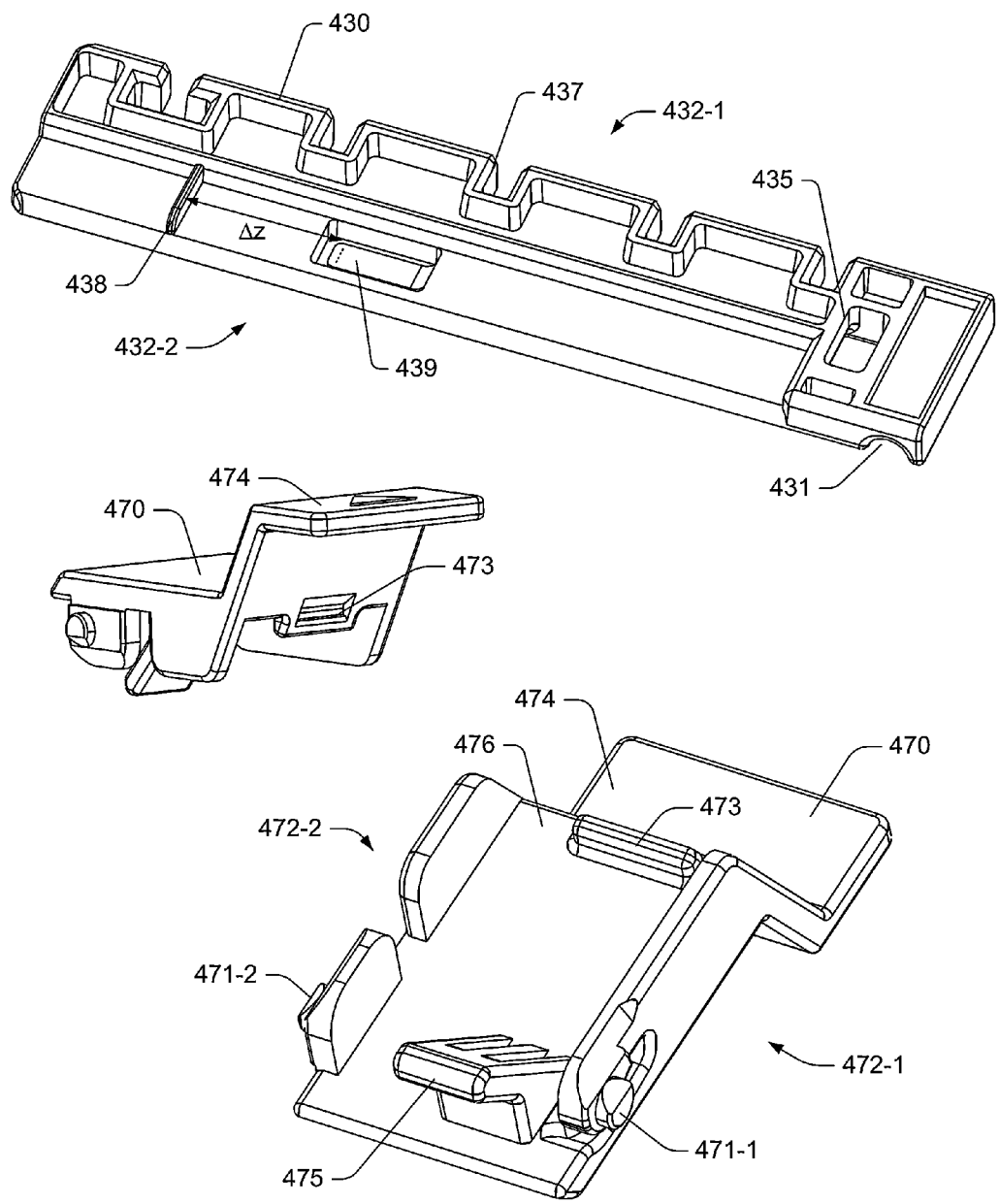

FIG. 5 and FIG. 6 show various perspective views of the retainer 430 and the handle 470. As shown, the handle 470 may include one or more axels 471-1, 472-2, a first side wall 472-1, a second side wall 472-1, a keeper 473, a grip 474, a lever 475, and a base 476. For example, the first and second side walls 472-1 and 472-2 may extend from the base 476 and include extensions from which the axels 471-1 and 471-2 extend outwardly therefrom. As an example, one of the extensions may be configured to flex, for example, to facilitate insertion of the axels 471-1 and 471-2 into openings 451-1 and 451-2 of the bracket 450 (see, e.g., FIG. 7).

As shown in FIG. 5 and FIG. 6, the retainer 430 can include a grip 431, a first side 432-1, a second side 432-2, a socket 435, a recess 437, a stop 438 and a resilient tongue 439. The socket 435 of the retainer 430 may receive the lever 475 of the handle 470 such that movement of the handle 470 acts to move the retainer 430, for example, to position the recess 437 (e.g., noting that in the example of FIG. 5 and FIG. 6, the retainer 430 is shown as including five recesses).

Figure 9:
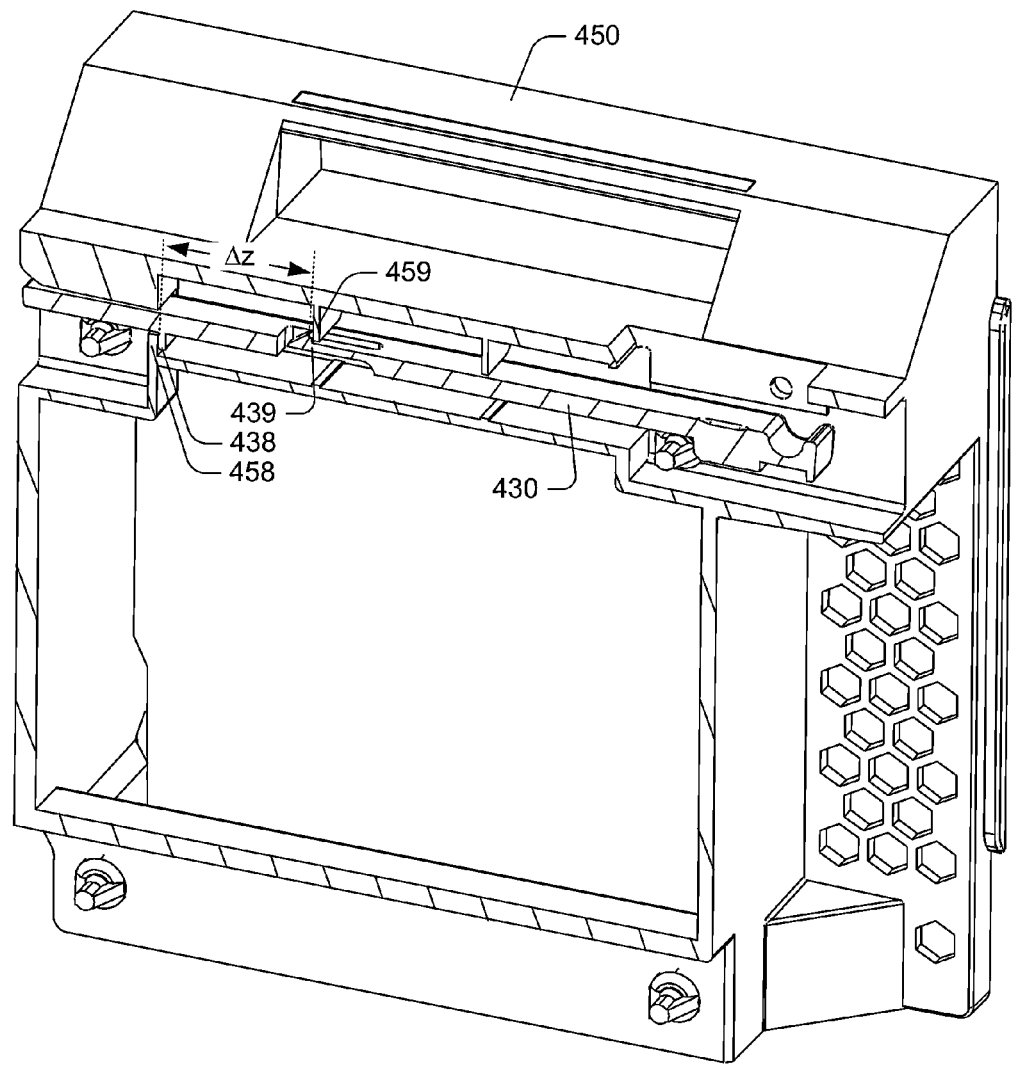
FIG. 9 is a diagram of a cutaway view of an example of the card retention assembly of FIG. 3.

As an example, the stop 438 may act to limit movement of the retainer 430 with respect to the bracket 450 (see, e.g., FIG. 9). For example, the stop 438 may contact a wall 458 of the bracket 450 (see, e.g., FIG. 9). As an example, the resilient tongue 439 may include an extension that may act as a catch with respect to the bracket 450 (see, e.g., FIG. 9). For example, the extension of the resilient tongue 439 may catch a wall 459 of the bracket 450 such that to move the retainer 430, force is applied to cause the resilient tongue 439 to deflect and thereby release the extension of the resilient tongue 439 from the wall 459. Such a mechanism may act to maintain the retainer 430 in the open orientation such that, for example, movement of a computing system does not cause the retainer 430 to move and alter clearances as to one or more recesses for insertion and/or removal of a card or card component. As an example, a computing system may be oriented with respect to gravity in one or more orientations and a card retention assembly of the computing system may include a mechanism that resists movement of a retainer of the card retention assembly where the retainer is in an open orientation (e.g., for insertion and/or removable of one or more cards, card components, etc.).

Figure 7:
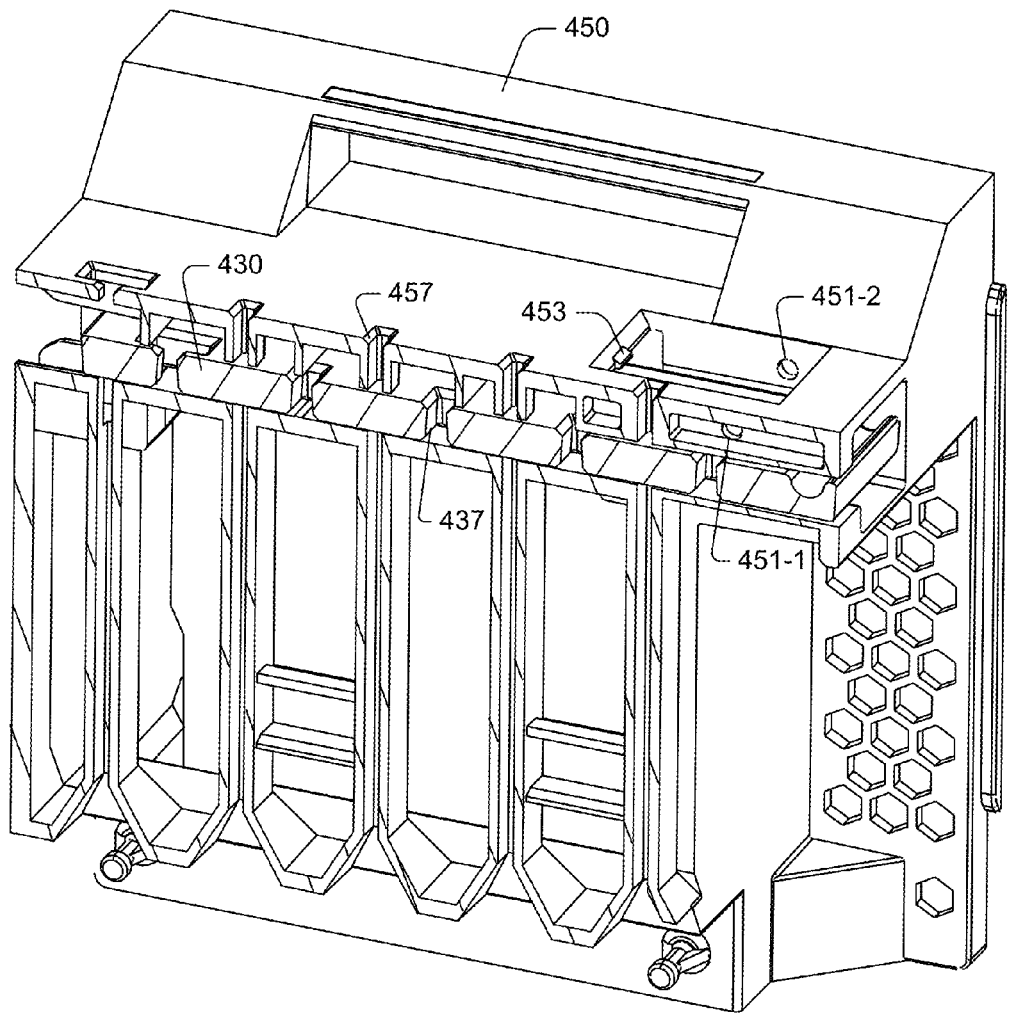
FIG. 7 and FIG. 8 are a series of diagrams of cutaway views of an example of the card retention assembly of FIG. 3.
Figure 8:
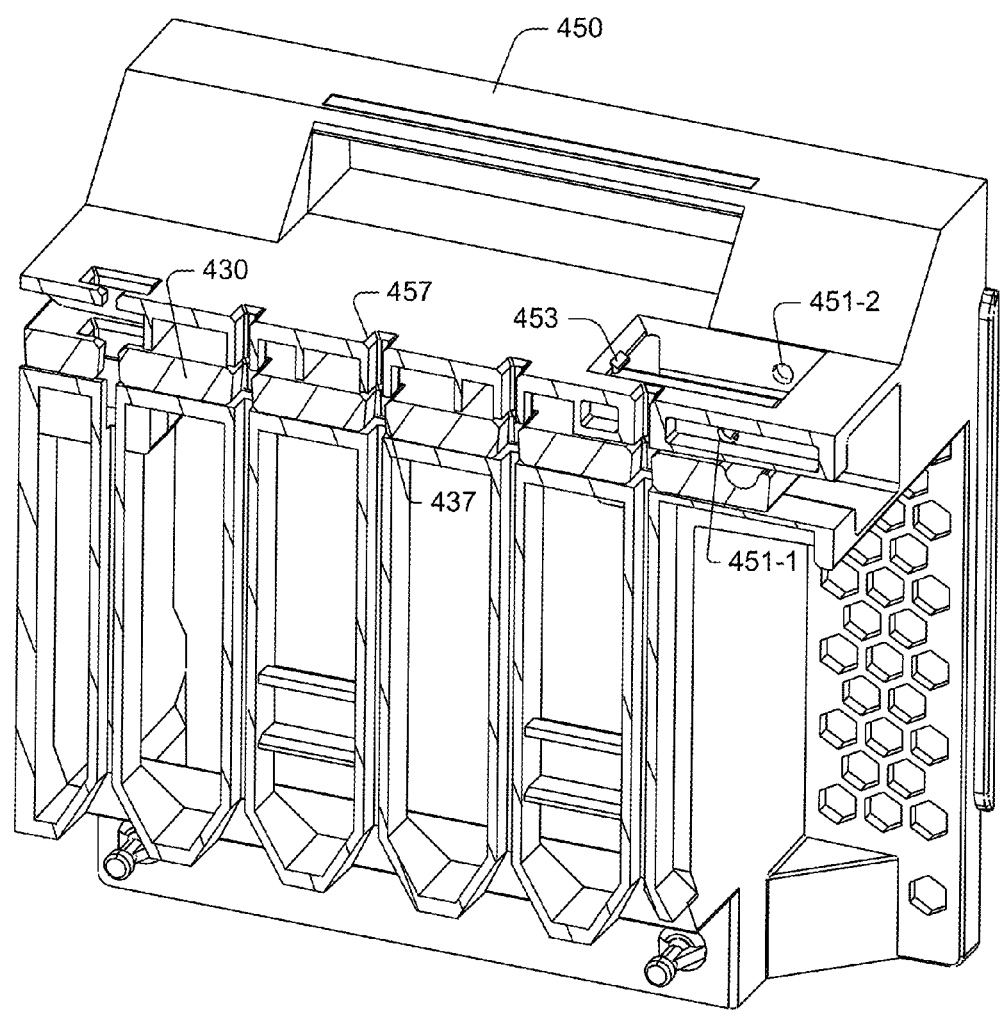

FIG. 7 and FIG. 8 show cutaway views of the retainer 430 and the bracket 450 of the card retention assembly 410 in a retention orientation (FIG. 7) and in an open orientation (FIG. 8). In the examples of FIG. 7 and FIG. 8, the retainer 430 may translate with respect to the bracket 450 (e.g., moving generally in a direction from left to right and right to left). As shown, translation of the retainer 430 causes the recess 437 of the retainer 430 to misalign with the recess 457 of the bracket 450 (e.g., retention orientation of FIG. 7) or to align with the recess 457 of the bracket 450 (e.g., open orientation of FIG. 8).

As shown in FIG. 7 and FIG. 8, the bracket 450 may include a latch 453 that extends from a wall of an opening that can receive at least a portion of the handle 470. In such an example, where the handle 470 includes the keeper 473, where the handle 470 is in a closed orientation with respect to the bracket 450, the latch 453 may be received by the keeper 473 such that a snap-fit force acts to maintain the handle 470 in the closed orientation. For example, the bracket 450 and the handle 470 may be made of polymeric material that may be resilient such that a snap-fit force may be achieved and, for example, overcome by a user gripping the handle portion 474 of the handle 470 and applying force to the handle portion 474 to pivot the handle 470 about its pivot axis to uncouple the keeper 473 from the latch 453.

As an example, the handle 470 may be operatively coupled to the bracket 450 in a manner that allows for some amount of flex at one or more of the axels 471-1 and 471-2. In such an example, the amount of flex may be sufficient to allow for coupling and uncoupling of the latch 453 and the keeper 473. While various examples refer to components that may be male or female in configuration, such components may optionally be rearranged. For example, the bracket 450 may include a keeper and the handle 470 may include a latch.

FIG. 9 shows a cutaway view of the retainer 430 and the bracket 450 of the card retention assembly 410. As mentioned, the stop 438 of the retainer 430 may contact a wall 458 of the bracket 450, which may limit motion of the retainer 430 with respect to the bracket 450 (e.g., generally to the left in FIG. 9). As mentioned, the resilient tongue 439 may include an extension that acts as a catch with respect to a wall 459 of the bracket 450. As an example, where the stop 438 contacts the wall 458, an extension of the resilient tongue 439 may catch on a wall 459. In such an example, the retainer 430 may resist movement of the retainer 430 with respect to the bracket 450 (e.g., generally to the right in FIG. 9). As an example, a dimension Δz may define a distance between the stop 438 and an extension of the resilient tongue 439 (see also FIG. 6). As an example, the bracket 450 may be configured for insertion of the retainer 430 without hindrance by the stop 438, for example, until the retainer 430 is inserted a distance whereby the stop 438 may contact the wall 458. As an example, the bracket 450 may include another wall such as the wall 459, for example, that acts to catch the retainer as it moves in a direction away from the wall 459 (e.g., generally to the right in FIG. 9). Once the resilient tongue 439 or other feature of the retainer 430 is past such a wall, the retainer may be removed from the bracket 450 (e.g., slide outwardly to the right).

Figure 10:
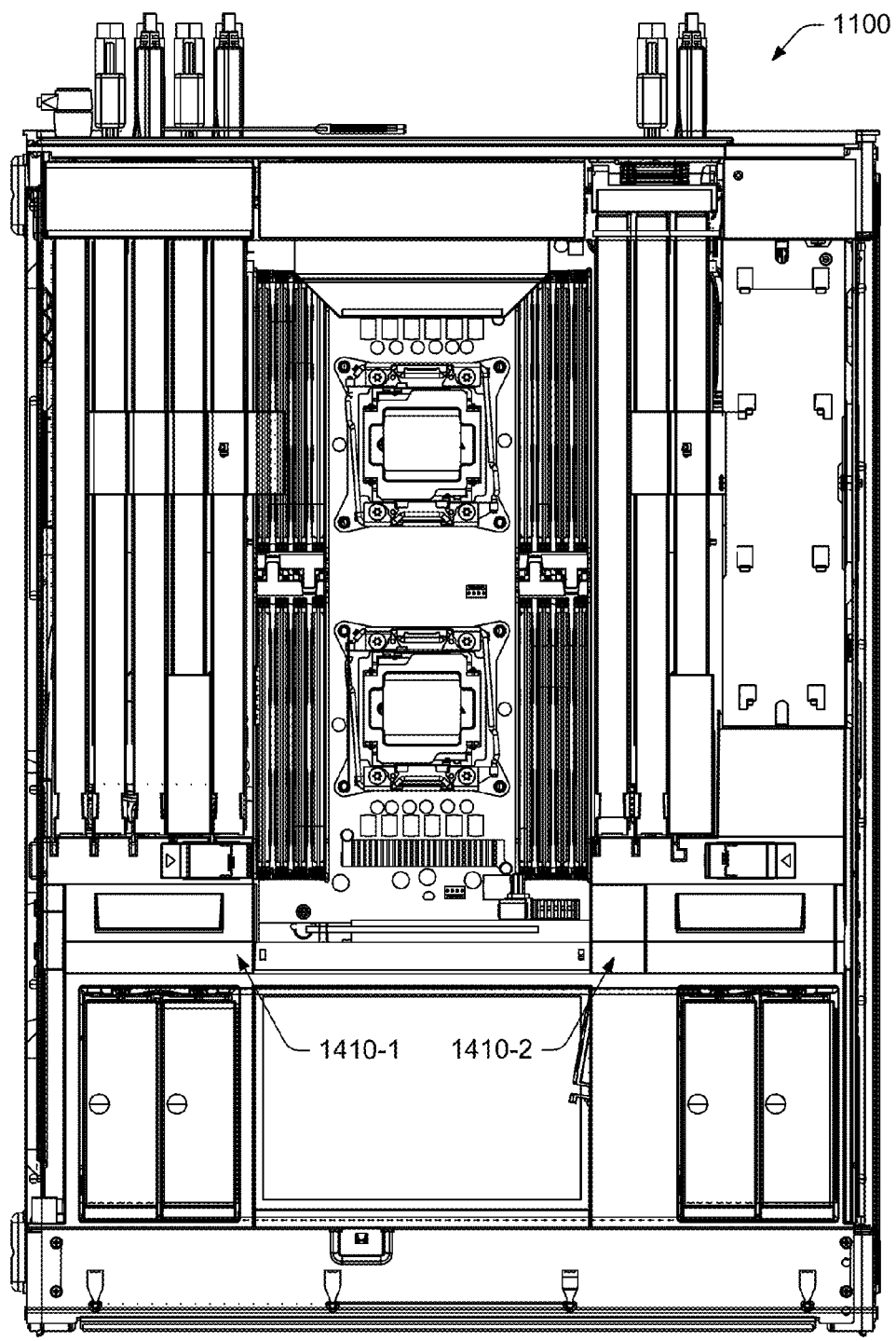
FIG. 10 is a diagram of an example of a computing system.

FIG. 10 shows an example of a computing system 1100 that includes two card retention assemblies 1410-1 and 1410-2. In the example of FIG. 10, one or both of the card retention assemblies 1410-1 and 1410-2 may include a respective fan unit.

Figure 11:
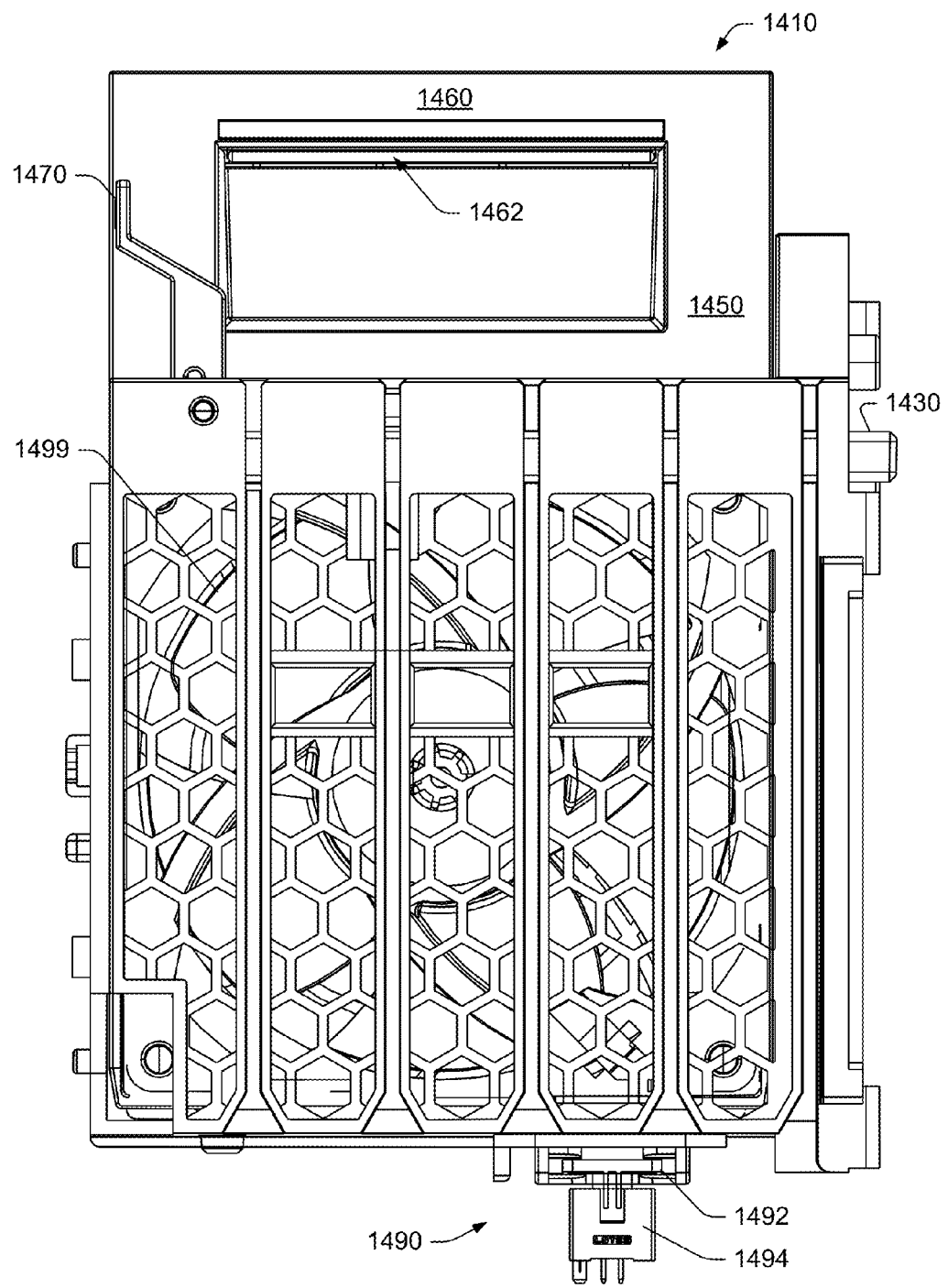
FIG. 11 is a diagram of an example of a card retention assembly that includes a fan unit.

FIG. 11 shows an example of a card retention assembly 1410 that includes a retainer 1430, a bracket 1450 and a handle 1470 as well as a plug mechanism 1490. The plug mechanism 1490 can include a portion 1492 carried by the assembly 1410 and a portion 1494 that may be fixed to a board or other component of a computing system such as, for example, the computing system 1100 of FIG. 10.

As shown in the example of FIG. 11, the card retention assembly 1410 includes a fan unit 1499 operatively coupled thereto. For example, as shown in the cross-sectional view (e.g., cutaway view) of FIG. 9, a bracket 450 may form a frame that can receive a fan unit. Such a fan unit may include wires that couple to the plug mechanism 1490.

As an example, the card retention assembly 1410 may be carried by a handle portion 1460 of the bracket 1450 (e.g., with cross-member 1462) and positioned with respect to a computing system and, for example, translated to couple the portion 1492 of the plug mechanism 1490 carried by the assembly 1410 to the portion 1494 of the plug mechanism 1490 (e.g., as fixed to the computing system, etc.). Such a method of assembly may provide for a blind connection with respect to the plug mechanism 1490. As an example, one or more features of the assembly 1410 (e.g., guides of side walls, etc.) may cooperate with one or more features of a computing system to guide the assembly 1410 into the computing system in a manner whereby the plug mechanism 1490 may be coupled (e.g., to at least in part power the fan 1499).

As an example, a system can include a chassis; a board operatively coupled to the chassis where the board includes card slots aligned along respective parallel planes and circuitry operatively coupled to the slots; a processor operatively coupled to the circuitry of the board; memory accessible by the processor; and a card retention assembly operatively coupled to the chassis where the card retention assembly includes parallel recesses corresponding to the parallel planes and a fan unit. In such an example, the system may include a power supply unit, the card retention assembly may include a portion of a plug mechanism and another portion of the plug mechanism may be operatively coupled to the chassis and operatively coupled to the power supply unit. In such an example, the portions of the plug mechanism may be joined (e.g., coupled) such that power form the power supply unit can power the fan unit, which, in turn, may direct air toward the card slots (e.g., to cool one or more cards disposed in such card slots). As an example, a system may include a plurality of card retention assemblies where, for example, one or more may include a fan unit.

As an example, a method of assembly of a card retention assembly may include inserting a retainer into a cavity of a bracket and then coupling a handle to the bracket whereby a lever and a socket of the handle and the retainer are positioned with respect to each other form cooperative movement. As an example, a handle may snap-fit to a bracket, for example, via an axel that extends from a flexible wall. As an example, an assembled card retention assembly may be implemented in a tool-less manner for insertion and/or removal of a card or a card component (e.g., with respect to a computing system).

As explained with respect to FIG. 9, a retainer may be maintained in an orientation that allows for insertion and/or removal of one or more cards and/or card components. For example, a retainer may be maintained in a bracket in an open orientation such that the retainer does not move in a manner that would cause it to interfere with paths (e.g., egress paths) that would interfere with insertion and/or removal of one or more cards and/or card components with respect to the bracket. In such an example, upon application of force, a catch may release and allow the retainer to transition from the open orientation to a retention orientation. Such a card retention mechanism may allow for orienting a computing system with respect to gravity such that gravity does not cause movement of a retainer when the retainer is in an open orientation.

As an example, after assembly of a computing system such as, for example, the computing system 100 of FIG. 1, a card retention mechanism may be oriented in a retention orientation that retains cards and/or card components. Such a mechanism may help to ensure that movement of the computing system does not cause one or more cards and/or card components to become displaced from a proper position in the computing system. Where it is desirable to insert another card or card component, remove a card or card component, etc., the mechanism may be oriented to an open orientation whereby paths become open for ingress and/or egress of one or more cards and/or card components. As an example, a card may be an adapter card and, as an example, a card component may be an adapter card component.

As an example, a system can include a chassis; a board operatively coupled to the chassis where the board includes card slots aligned along respective parallel planes and circuitry operatively coupled to the slots; a processor operatively coupled to the circuitry of the board; memory accessible by the processor; a bracket operatively coupled to the chassis where the bracket includes parallel recesses corresponding to the parallel planes; and a retainer operatively coupled to the bracket where the retainer includes parallel recesses where in an open orientation the parallel recesses of the retainer align with the parallel recesses of the bracket and where in a retention orientation the parallel recesses of the retainer misalign with the parallel recesses of the bracket. In such an example, the parallel recesses of the bracket may be offset from the parallel planes.

As an example, recesses of a bracket may include recess shapes where at least one of the recess shapes differs from at least one other of the recess shapes. As an example, recesses of a retainer may include recess shapes where at least one of the recess shapes differs from at least one other of the recess shapes.

As an example, a card retention assembly may include a handle operatively coupled to a bracket and operatively coupled to a retainer. In such an example, the handle may operatively couple the retainer to the bracket. As an example, a handle may include an open orientation that positions a retainer in an open orientation and the handle may include a closed orientation that positions the retainer in a retention orientation. As an example, a handle may include axels that are received by openings of a bracket where, for example, the axels and openings define a pivot axis for pivotable movement of the handle with respect to the bracket. As an example, a handle and a bracket may include a latch mechanism that latches the handle in a closed orientation.

As an example, a handle may include a lever and a retainer may include a socket configured to receive at least a portion of the lever. In such an example, the handle may be a pivotable handle where pivoting of the pivotable handle moves the lever and translates the retainer with respect to the bracket.

As an example, an assembly may include a retainer that includes a stop and a bracket that includes a stop surface where contact between the stop and the stop surface limits translation of the retainer with respect to the bracket. As an example, an assembly may include a retainer that includes a catch where a bracket includes a catch surface where contact between the catch and the catch surface limits translation of the retainer with respect to the bracket. As an example, a retainer and a bracket may include a stop mechanism that, in the open orientation, limits movement of the retainer with respect to the bracket.

As an example, a bracket may include at least 2 recesses. As an example, a retainer may include at least 2 recesses. As an example, a board may include at least two slots. As an example, a bracket may include at least 2 recesses, a retainer may include at least 2 recesses and a board may include at least two slots.

As an example, a system can include a motherboard where a processor is mounted to the motherboard via a processor socket. As an example, a system may include a card disposed in one of a plurality of card slots. In such an example, the card slots may include one or more PCI card slots. In such an example, the system may include PCI cards disposed in PCI card slots.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 12:
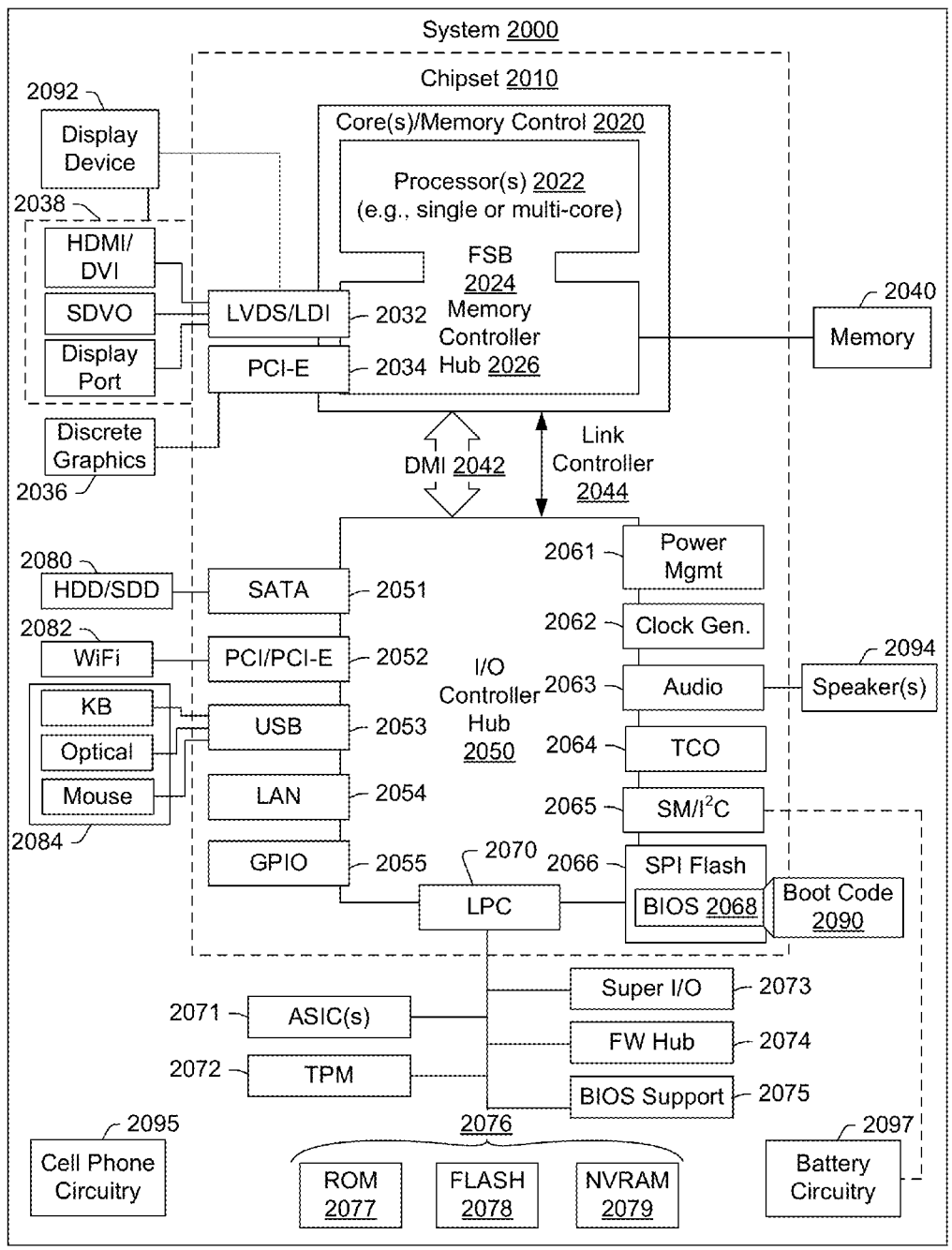
FIG. 12 is a diagram of an example of circuitry of a system, a device, etc.

While various examples of circuits or circuitry may be shown or discussed, FIG. 12 depicts a block diagram of an illustrative computer system 2000. The system 2000 may be a computer system, such as one of the ThinkCentre® or ThinkPad® series of computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 2000 (e.g., consider the ThinkServer® server sold by Lenovo (US) Inc. of Morrisville, N.C.).

As shown in FIG. 12, the system 2000 includes a so-called chipset 2010. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 2010 has a particular architecture, which may vary to some extent depending on brand or manufacturer. The architecture of the chipset 2010 includes a core and memory control group 2020 and an I/O controller hub 2050 that exchange information (e.g., data, signals, commands, etc.) via, for example, a direct management interface or direct media interface (DMI) 2042 or a link controller 2044. In the example of FIG. 12, the DMI 2042 is a chip-to-chip interface (sometimes referred to as being a link between a "northbridge" and a "southbridge").

The core and memory control group 2020 include one or more processors 2022 (e.g., single core or multi-core) and a memory controller hub 2026 that exchange information via a front side bus (FSB) 2024. As described herein, various components of the core and memory control group 2020 may be integrated onto a single processor die, for example, to make a chip that supplants the conventional "northbridge" style architecture.

The memory controller hub 2026 interfaces with memory 2040. For example, the memory controller hub 2026 may provide support for DDR SDRAM memory (e.g., DDR, DDR2, DDR3, etc.). In general, the memory 2040 is a type of random-access memory (RAM). It is often referred to as "system memory".

The memory controller hub 2026 further includes a low-voltage differential signaling interface (LVDS) 2032. The LVDS 2032 may be a so-called LVDS Display Interface (LDI) for support of a display device 2092 (e.g., a CRT, a flat panel, a projector, etc.). A block 2038 includes some examples of technologies that may be supported via the LVDS interface 2032 (e.g., serial digital video, HDMI/DVI, display port). The memory controller hub 2026 also includes one or more PCI-express interfaces (PCI-E) 2034, for example, for support of discrete graphics 2036. Discrete graphics using a PCI-E interface has become an alternative approach to an accelerated graphics port (AGP). For example, the memory controller hub 2026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2050 includes a variety of interfaces. The example of FIG. 12 includes a SATA interface 2051, one or more PCI-E interfaces 2052 (optionally one or more legacy PCI interfaces), one or more USB interfaces 2053, a LAN interface 2054 (more generally a network interface), a general purpose I/O interface (GPIO) 2055, a low-pin count (LPC) interface 2070, a power management interface 2061, a clock generator interface 2062, an audio interface 2063 (e.g., for speakers 2094), a total cost of operation (TCO) interface 2064, a system management bus interface (e.g., a multi-master serial computer bus interface) 2065, and a serial peripheral flash memory/controller interface (SPI Flash) 2066, which, in the example of FIG. 12, includes BIOS 2068 and boot code 2090. With respect to network connections, the I/O hub controller 2050 may include integrated gigabit Ethernet controller lines multiplexed with a PCI-E interface port. Other network features may operate independent of a PCI-E interface.

The interfaces of the I/O hub controller 2050 provide for communication with various devices, networks, etc. For example, the SATA interface 2051 provides for reading, writing or reading and writing information on one or more drives 2080 such as HDDs, SDDs or a combination thereof. The I/O hub controller 2050 may also include an advanced host controller interface (AHCI) to support one or more drives 2080. The PCI-E interface 2052 allows for wireless connections 2082 to devices, networks, etc. The USB interface 2053 provides for input devices 2084 such as keyboards (KB), one or more optical sensors, mice and various other devices (e.g., microphones, cameras, phones, storage, media players, etc.). On or more other types of sensors may optionally rely on the USB interface 2053 or another interface (e.g., $I^2C$, etc.).

In the example of FIG. 12, the LPC interface 2070 provides for use of one or more ASICs 2071, a trusted platform module (TPM) 2072, a super I/O 2073, a firmware hub 2074, BIOS support 2075 as well as various types of memory 2076 such as ROM 2077, Flash 2078, and non-volatile RAM (NVRAM) 2079. With respect to the TPM 2072, this module may be in the form of a chip that can be used to authenticate software and hardware devices. For example, a TPM may be capable of performing platform authentication and may be used to verify that a system seeking access is the expected system.

The system 2000, upon power on, may be configured to execute boot code 2090 for the BIOS 2068, as stored within the SPI Flash 2066, and thereafter processes data under the control of one or more operating systems and application software (e.g., stored in system memory 2040). An operating system may be stored in any of a variety of locations and accessed, for example, according to instructions of the BIOS 2068. Again, as described herein, a satellite, a base, a server or other machine may include fewer or more features than shown in the system 2000 of FIG. 12. Further, the system 2000 of FIG. 12 is shown as optionally including cell phone circuitry 2095, which may include GSM, CDMA, etc., types of circuitry configured for coordinated operation with one or more of the other features of the system 2000.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a chassis;
a board operatively coupled to the chassis wherein the board comprises card slots aligned along respective parallel planes and circuitry operatively coupled to the slots;
a processor operatively coupled to the circuitry of the board;
memory accessible by the processor;
a bracket operatively coupled to the chassis wherein the bracket comprises parallel recesses corresponding to the parallel planes; and
a retainer operatively coupled to the bracket wherein the retainer comprises parallel recesses wherein in an open orientation the parallel recesses of the retainer align with the parallel recesses of the bracket and wherein in a retention orientation the parallel recesses of the retainer misalign with the parallel recesses of the bracket.

2. The system of claim 1 wherein the parallel recesses of the bracket are offset from the parallel planes.

3. The system of claim 1 wherein the recesses of the bracket comprise recess shapes and wherein at least one of the recess shapes differs from at least one other of the recess shapes.

4. The system of claim 1 wherein the recesses of the retainer comprise recess shapes and wherein at least one of the recess shapes differs from at least one other of the recess shapes.

5. The system of claim 1 comprising a handle operatively coupled to the bracket and operatively coupled to the retainer.

6. The system of claim 5 wherein the handle comprises an open orientation that positions the retainer in the open orientation and wherein the handle comprises a closed orientation that positions the retainer in the retention orientation.

7. The system of claim 5 wherein the handle comprises axels that are received by openings of the bracket wherein the axels and openings define a pivot axis for pivotable movement of the handle with respect to the bracket.

8. The system of claim 5 wherein the handle and the bracket comprise a latch mechanism that latches the handle in a closed orientation.

9. The system of claim 5 wherein the handle comprises a lever and wherein the retainer comprises a socket configured to receive at least a portion of the lever.

10. The system of claim 9 wherein the handle comprises a pivotable handle wherein pivoting of the pivotable handle moves the lever and translates the retainer with respect to the bracket.

11. The system of claim 1 wherein the retainer comprises a stop and wherein the bracket comprises a stop surface wherein contact between the stop and the stop surface limits translation of the retainer with respect to the bracket.

12. The system of claim 1 wherein the retainer comprises a catch and wherein the bracket comprises a catch surface wherein contact between the catch and the catch surface limits translation of the retainer with respect to the bracket.

13. The system of claim 1 wherein the retainer and the bracket comprise a stop mechanism that, in the open orientation, limits movement of the retainer with respect to the bracket.

14. The system of claim 1 wherein the bracket comprises at least 2 recesses.

15. The system of claim 1 wherein the retainer comprises at least 2 recesses.

16. The system of claim 1 wherein the board comprises at least two slots.

17. The system of claim 1 wherein the board comprises a motherboard wherein the processor is mounted to the board via a processor socket.

18. The system of claim 1 comprising a card disposed in one of the card slots.

19. A system comprising:
a chassis;
a board operatively coupled to the chassis wherein the board comprises card slots aligned along respective parallel planes and circuitry operatively coupled to the slots;
a processor operatively coupled to the circuitry of the board;
memory accessible by the processor; and
a card retention assembly operatively coupled to the chassis wherein the card retention assembly comprises parallel recesses corresponding to the parallel planes and wherein the card retention assembly comprises a fan unit.

20. The system of claim 19 wherein the system comprises a power supply unit and wherein the card retention assembly comprises a portion of a plug mechanism and wherein another portion of the plug mechanism is operatively coupled to the chassis and operatively coupled to the power supply unit.

* * * * *